(12) United States Patent
Scherrer

(10) Patent No.: US 7,520,401 B2
(45) Date of Patent: Apr. 21, 2009

(54) TANK CAP HAVING DETENT DEVICE

(75) Inventor: Konred H. Scherrer, Hllden (DE)

(73) Assignee: Tesma Europa GmbH, Grevenbroich (DE)

( * ) Notice: Subject to any disclaimer, the term of this patent is extended or adjusted under 35 U.S.C. 154(b) by 535 days.

(21) Appl. No.: 10/933,253

(22) Filed: Sep. 3, 2004

(65) Prior Publication Data
US 2005/0051555 A1 Mar. 10, 2005

(30) Foreign Application Priority Data
Sep. 4, 2003 (DE) .............................. 203 13 900 U

(51) Int. Cl.
*B65D 51/16* (2006.01)
*B65D 53/00* (2006.01)

(52) U.S. Cl. ................. 220/303; 220/304; 220/DIG. 33

(58) Field of Classification Search ................. 220/303, 220/304, DIG. 33
See application file for complete search history.

(56) References Cited

U.S. PATENT DOCUMENTS

| | | | | |
|---|---|---|---|---|
| 2,534,003 A | * | 12/1950 | Culver et al. | ................ 220/86.2 |
| 3,912,117 A | * | 10/1975 | Ryding | ........................ 220/293 |
| 4,955,167 A | * | 9/1990 | Holtgreve | ..................... 52/199 |
| 6,286,704 B1 | * | 9/2001 | Harris | ......................... 220/304 |
| 6,705,483 B2 | * | 3/2004 | Hagano et al. | .............. 220/303 |

* cited by examiner

*Primary Examiner*—Robin Hylton
(74) *Attorney, Agent, or Firm*—Berenato, White & Stavish

(57) ABSTRACT

A cap, in particular a tank cap, has a handle part for manipulating the cap upon screwing into and out of a neck, and has an engagement part for engagement of the cap in the neck. The handle part and engagement part are connected via a detent device that is embodied in such a way that in the screwing-in direction, after a detent resistance is overcome it allows the handle part to continue rotating out of a detent position relative to the engagement part with decreased rotation resistance. The detent device comprises only a single detent position; and a stop is provided for limiting the rotation angle of the handle part after the detent resistance is overcome.

13 Claims, 2 Drawing Sheets

TANK CAP HAVING DETENT DEVICE

CROSS-REFERENCE TO RELATED APPLICATIONS AND CLAIM TO PRIORITY

This application claims the benefit of utility model application number 203 13 900.3, filed Sep. 4, 2003, in the Federal Republic of Germany, the disclosure of which is incorporated herein by reference and priority to which is claimed under 35 U.S.C. § 119.

FIELD OF THE INVENTION

The invention concerns a cap, in particular a tank cap, having a handle part for manipulating the cap upon screwing into and out of a neck, and having an engagement part for engagement of the cap in the neck, the handle part and engagement part being connected via a detent device that is embodied in such a way that in the screwing-in direction, after a detent resistance is overcome it allows the handle part to continue rotating out of a detent position relative to the engagement part with decreased rotation resistance.

BACKGROUND OF THE INVENTION

For closing off a tank neck, tank caps are known in the existing art that comprise a handle part for manipulating the tank cap upon screwing into and out of the tank neck, and an engagement part that, in order to screw in the tank cap, is inserted into the tank neck and enters into a positively fitting connection with the tank neck by being screwed in. This can occur in the form of a threaded closure or a bayonet closure.

Upon closure of the tank neck using the tank cap, it is important that the tank cap reach the intended final position so that the tank is sealed against fuel loss. It is necessary for this purpose for the operator to receive a signal from which he can conclude that the final position has in fact been reached.

It is known for this purpose in the existing art to connect the handle part and engagement part to one another via a detent device which is embodied in such a way that it is blocked in the unscrewing direction, but in the screwing-in direction allows the handle part to continue rotating out of the detent position relative to the engagement part after a detent resistance is overcome. The detent resistance is set, in this context, in such a way that the engagement part is carried along as far as the final position as the cap is screwed in, i.e. the screwing-in resistance is substantially less. Upon attainment of the final position, the handle part can continue to be rotated by overcoming the detent resistance. This involves traveling over several detent depressions arranged in close proximity, so that a rattling noise is produced that is intended to indicate acoustically to the user that the final position has been reached. Because of the rapid alternation of increasing and decreasing rotation resistance, the user is also haptically informed that the final position has been reached.

With this type of detent device, considerable abrasion occurs on the detent members and can impair the function of the overpressure and negative-pressure valve usually present in such caps. A variety of proposals have therefore been made for indicating attainment of the final position by way of a single optical or acoustic signal (cf. DE 203 08 736 U1; DE 203 08 737 U1). Leaving aside the fact that the mechanism for generating the signals is relatively complex, the use of such a cap requires a certain amount of attention.

SUMMARY OF THE INVENTION

It is the object of the invention to configure a cap of the kind cited initially in such a way that it is of simple design and nevertheless, upon attainment of the final position, gives the user a reliable feel for the fact that he has closed off the neck with the cap in the intended fashion.

This object is achieved, according to the present invention, in that the detent device comprises only a single detent position; and that a stop is provided for limiting the rotation angle of the handle part after the detent resistance is overcome. As a result of this configuration, the user receives information concerning attainment of the final position by the fact that the resistance first rises in order to overcome the detent resistance but then drops again, and the handle part runs against a stop and is thereby prevented from rotating further. This combination of resistance increase, resistance reduction, and blockage gives the user an unequivocal, haptically active signal that he has reached the final position. This signal is independent of acoustical and optical environmental conditions, i.e. cannot be masked by noise or overlooked in unfavorable light conditions. In addition, a detent connection of this kind between the handle part and engagement part can be manufactured in mechanically simple fashion, and is also subject to little wear.

The rotation angle between the detent position and stop position should be large enough that the reduction in rotation resistance after the detent resistance is overcome becomes clearly perceptible. It should therefore advantageously be at least 10 degrees, or better at least 15 degrees. Excessively large rotation angles should be avoided, however, so as not to give the impression that the cap is defective.

The detent device should comprise on the one hand at least one detent depression and on the other hand at least one detent member guided movably into or out of the detent depression (s), the detent member(s) being impinged upon by a spring toward the associated detent depression(s). It is fundamentally inconsequential, in this context, whether the detent depression(s) is/are provided on the engagement-part side or the handle-part side, and the detent member(s) is/are accordingly guided on the respective other part. It has proven useful in terms of design that the detent member(s) is/are guided at least substantially radially. This does not, however, exclude an axial movability of the detent member, and thus also a corresponding alignment of the associated detent depression (s).

In a further embodiment of the invention, provision is made for the detent depression(s) to be open at least substantially radially inward, and for the detent member(s) to be impinged upon radially outward by the spring. This permits a particularly compact design. The possibility exists here of shaping the detent depression(s) into a detent ring into which fits a guide member having the detent member(s) guided therein. The stop can then project inward from the detent ring.

It is moreover proposed according to the invention that a further stop be provided which blocks the rotary motion of the handle part in the unscrewing direction relative to the engagement part. Such blockage can also be effected by a combination of detent member(s) and detent depression(s), but an additional stop relieves stress on the detent device and can be of more robust configuration, thus avoiding damage to the detent device as the cap is unscrewed out of the neck.

In a particularly preferred embodiment of the invention, it is proposed that a return device be provided for automatically rotating the handle part back out of an unlatched position into the detent position. A return device of this kind ensures that the handle part, after the detent resistance is overcome, is automatically returned to the detent position when the user releases the handle part, in particular if he has continued to rotate the handle part as far as the stop. This prevents the handle part from being in an unsecured state after leaving the detent position. A possibly irritating free play when the cap is once again to be unscrewed from the neck is also prevented.

The return device can usefully comprise a spring that preferably is increasingly impinged upon, i.e. loaded, as the handle part continues to rotate relative to the engagement part, a load that reliably returns the handle part back to the detent position being sufficient. This can involve a spring separate from the detent device, against which the handle part runs upon leaving the detent position. It is particularly advantageous, however, to employ for this the spring that is provided in any case for impinging the detent member(s) toward the detent depression(s). This can be accomplished by the fact that the detent member or at least one of the detent members, after leaving the detent depression(s), runs onto a ramp that, upon further rotation of the handle part, generates a motion of the detent member(s) against the action of the spring such that the handle part is automatically moved back into the detent position by the action of the spring. The ramp thus causes the spring to be increasingly loaded by the detent member. When the handle part is released, the detent member slides, as a result of the loading of the spring (which is then increasingly relaxing again), along the ramp back toward the detent position.

DESCRIPTION OF THE DRAWINGS

The invention is illustrated in more detail, with reference to an exemplary embodiment, in the drawings, in which.

DETAILED DESCRIPTION OF THE PREFERRED EMBODIMENT(S)

Figure 1:
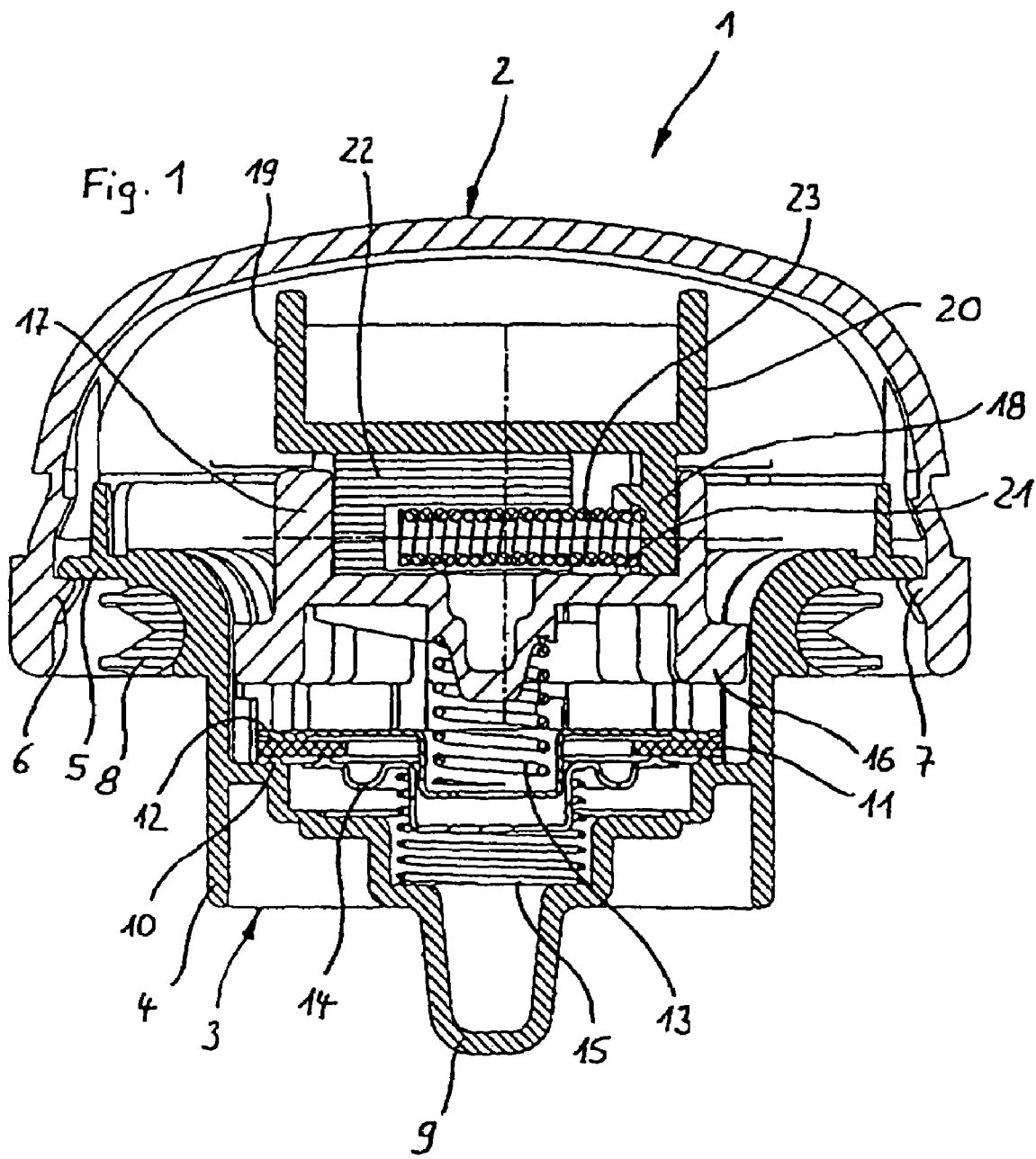
FIG. 1 shows the cap according to the present invention in vertical section.

Tank cap 1 depicted in the Figures has a hat-shaped handle part 2 whose external shape is such that a flange projecting upward, at which tank cap 1 can be gripped, is formed. Handle part 2 is slipped over an engagement part 3 that comprises an engagement segment 4. Engagement segment 4 is provided on the outer side with engagement elements (not depicted here in detail), e.g. a thread, with which tank cap 1 can be brought into engagement with a corresponding thread in a tank neck. Engagement segment 4 transitions upward into a collar 5, horizontally bent over radially outward, beneath which handle part 2 is fitted by means of snap projections 6, 7. A sealing ring 8 surrounds the transition between engagement segment 4 and collar 5, and provides sealing with respect to the neck.

Engagement segment 4 comprises internally a support shell 9 that constitutes a valve seat ring 10. Support shell 9 has openings (not depicted here in detail) through which a connection is made to the tank. Resting on top of valve seat ring 10 is a disk-shaped valve ring 11. It is impinged upon from above by a first valve plate 12 that is pressed toward valve ring 11 by a compressively stressed first valve spring 13. Valve ring 11 is impinged upon from the underside by a second valve plate 14 that is pressed toward valve ring 11 by a compressively stressed second valve spring 15 bracing against support shell 9. It rests against valve ring 10 in such a way that it sealingly encircles the opening enclosed by it. Second valve spring 15 has a smaller spring force than first valve spring 13.

In the event of an overpressure on the tank side, valve ring 11 and valve plates 12, 14 lift off against the action of first valve spring 13. Gas can thus flow into the atmosphere out of the tank that is closed off with cap 1, corresponding conduits and openings being present in engagement part 3 and handle part 2. In the event of a negative pressure, second valve plate 14 lifts off from valve ring 11 against the action of second valve spring 15, so that air can flow back into the tank through the opening in valve 10 and a centered opening in first valve plate 12.

An undershell 16 is nonrotatably clipped internally into engagement part 3. First valve spring 13 braces against the lower side of this undershell 16. Undershell 16 has a detent ring 17 projecting up from it. Protruding into detent ring 17 from above is a guide housing 18 that is nonrotatably connected to handle part 2 on the upper side by way of upwardly projecting coupling tabs 19, 20.

Figure 2:
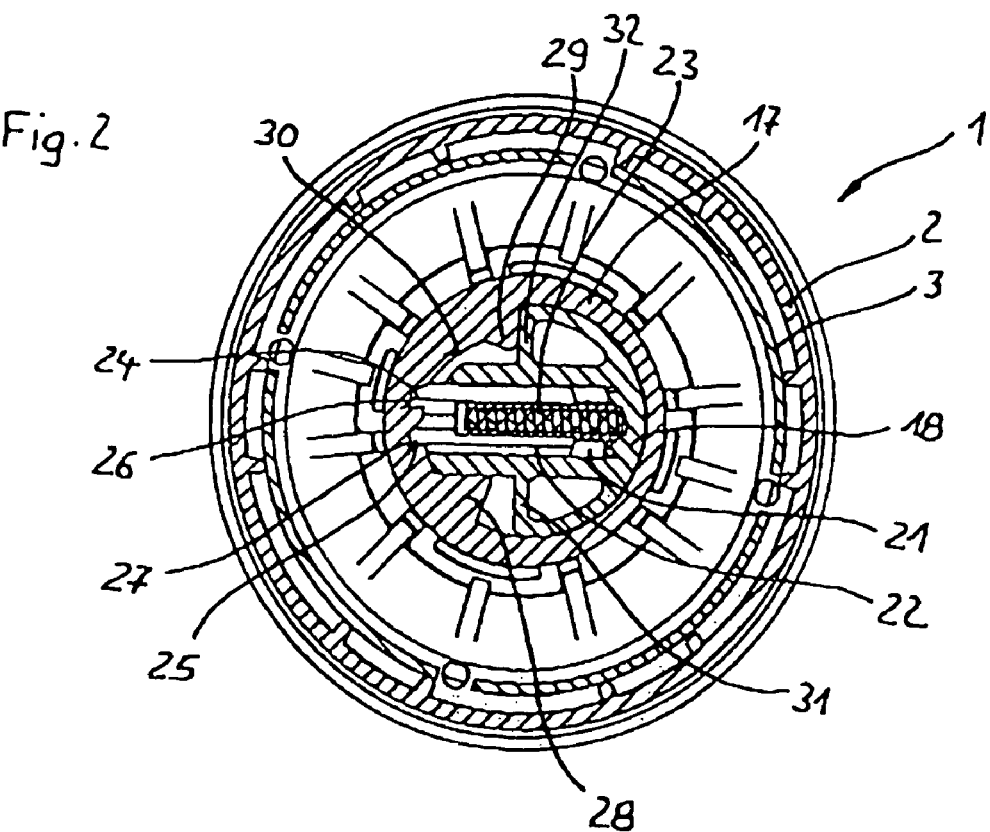
FIG. 2 shows the cap according to FIG. 1 with the handle part latched in, in horizontal section.
Figure 3:
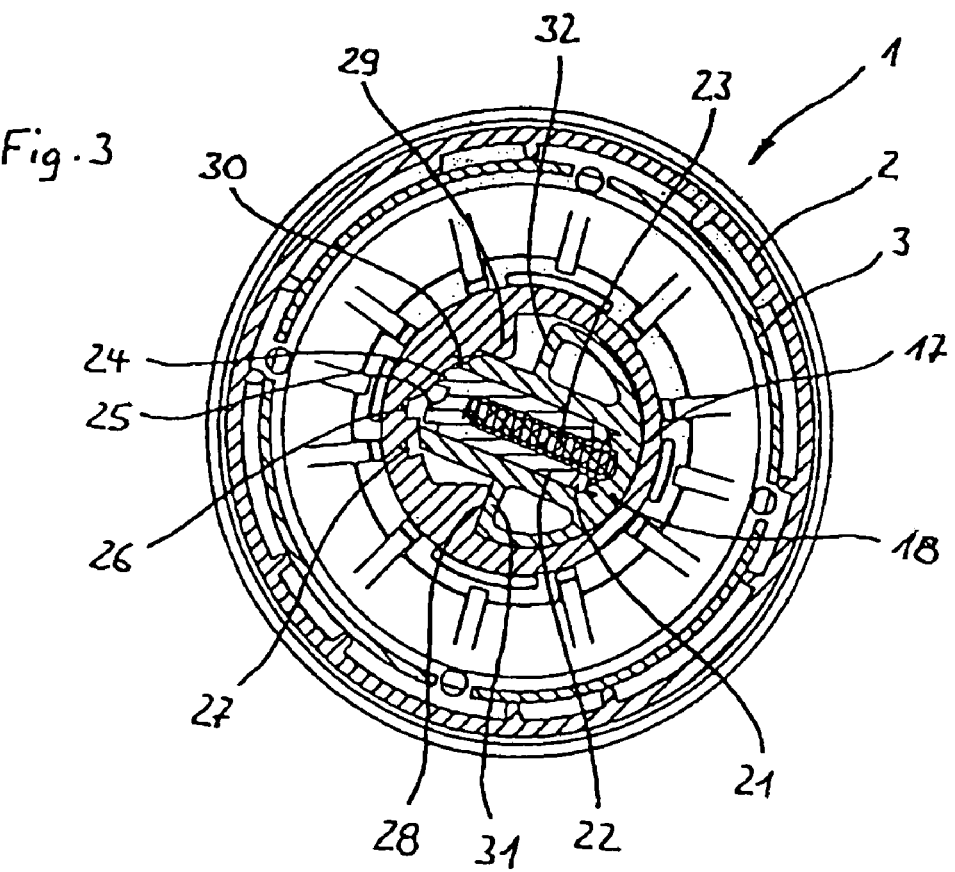
FIG. 3 shows the cap as depicted in FIG. 2, with the handle part in the unlatched position.

As is evident in particular from FIGS. 2 and 3, guide housing 18 comprises a radially extending guide channel 21 in which a detent member 22 is guided in radially displaceable fashion. Detent member 22 is impinged upon by the force of a compression spring 23. Compression spring 23 is braced at one end against detent member 22, and at the other end against guide housing 18. Detent member 22 has, at its end protruding from guide channel 21, two detent lugs 24, 25 that lie one behind the other in the rotation direction of guide housing 18. Detent lugs 24, 25 correspond to complementarily shaped detent depressions 26, 27 that are shaped in the inner side of detent ring 17. Detent ring 17 additionally comprises first and second stops 28, 29, projecting radially inward from the inner side, which limit the rotational movability of guide housing 18 with respect to detent ring 17.

In FIG. 2, detent member 22 and detent depressions 26, 27 are in the detent position, i.e. detent lugs 24, 25 are latched into detent depressions 26, 27. Handle part 2 and engagement part 3 are then, because of the latching of detent member 22 and detent ring 17, connected to one another sufficiently nonrotatably that tank cap 1 can be screwed as far as its final position into a tank neck provided therefor. The screwing-in resistance prior to the final position is considerably less than the detent resistance between detent lugs 24 and 25 and detent depressions 26, 27. In FIGS. 2 and 3, the screwing-in direction is a clockwise rotation.

Once tank cap 1 reaches its final position, further rotation of engagement part 3 is blocked. The user will, however, attempt to rotate handle part 2 further because he is not sure whether the final position has in fact been reached. In so doing, he overcomes the detent resistance at the oblique surfaces of detent lugs 24, 25 and at detent depressions 26, 27. Detent member 22 is pushed into guide housing 18 against the action of compression spring 23, so that detent lug 24 located at the front in the rotation direction runs onto a ramp 30 of detent ring 17. This ramp 30 has a radius that becomes increasingly smaller with respect to the rotation axis of guide housing 18, so that as handle part 2 is rotated further, detent member 22 is pushed correspondingly farther into guide housing 18 and compression spring 23 becomes increasingly compressed. The overall rotation resistance that builds up in this context is, however, substantially less than the detent resistance that had to be overcome as detent lugs 24, 25 traveled out of detent depressions 26, 27. This is clearly perceptible to the user.

Free-play motion of handle part 2 relative to the engagement part is possible only as far as the position shown in FIG. 3. In this position, a first projection 31 of guide housing 18 comes to a stop against first stop 28. The combination of high detent resistance, low free-play resistance, and blockage by first stop 28 gives the user a clearly perceptible signal that the final position has reliably been attained and no further rotation is necessary. He then releases handle part 2. The action of compression spring 23 is sufficiently strong that detent lug 24 slides on ramp 23 back toward detent depressions 26, 27, and handle part 2 is thus returned to the detent position as shown in FIG. 2. Detent lugs 24, 25 then engage once again into detent depressions 26, 27, in which context a second projection 32 comes to a stop against second stop 29. When handle part 2 is then rotated in the unscrewing direction (counter-clockwise), the rotational motion is transferred via guide housing 18, second projection 32, and second stop 29 to detent ring 17 and thus to engagement part 3 and its engagement segment 4. Detent lugs 24, 25 are thus relieved of any torque transfer load.

I claim:

1. A cap, having a handle part for manipulating the cap upon screwing into and out of a neck, and having an engagement part for engagement of the cap in the neck, and having a detent device intermediate and connecting the handle part and the engagement part, the detent device embodied in such a way that in a screwing-in direction, after a detent resistance is overcome it allows the handle part to continue rotating out of a single detent position relative to the engagement part with decreased rotational resistance, wherein the detent device comprises, at least one detent depression, at least one detent member movably guided into or out of the detent depression, a spring biasing at least a portion of the detent member so that the detent depression causes engagement between the handle part and the engagement part when in the single detent position; and a stop configured for limiting a rotation angle of the handle part after the detent resistance is overcome.

2. The cap as defined in claim 1, wherein the rotation angle is at least 10 degrees.

3. The cap as defined in claim 1, wherein the detent member is guided at least substantially radially.

4. The cap as defined in claim 3, wherein the detent depression is open at least substantially radially inward, and the detent member is impinged upon radially outward by the spring.

5. The cap as defined in claim 4, wherein the detent depression is disposed in a detent ring into which fits a guide member having the detent member guided therein.

6. The cap as defined in claim 5, wherein the stop projects inward.

7. The cap as defined in claim 1, wherein a further stop is provided which blocks rotational motion of the handle part in an unscrewing direction relative to the engagement part.

8. The cap as defined in claim 1, wherein a return device is provided for automatically rotating the handle part back out of an unlatched position into the detent position.

9. The cap as defined in claim 8, wherein the return device comprises a spring that is impinged upon as the handle part continues to rotate relative to the engagement part.

10. The cap as defined in claim 1, wherein the detent member, after overcoming the detent resistance and leaving the detent depression, engages a ramp that, upon further rotation of the handle part, pushes the detent member against an action of the spring such that the handle part automatically pivots back into the detent position by the action of the spring.

11. The cap of claim 5, wherein the stop extends outwardly from an inner surface of the detent ring.

12. The cap of claim 5, wherein the guide member includes a guide channel in which the detent member is radially guided.

13. The cap of claim 12, wherein the spring is disposed within the guide channel and biases at least the portion of the detent member radially outward.

* * * * *